April 20, 1965 R. E. SELTZER 3,179,040
RELIEF VALVE
Filed Nov. 6, 1961
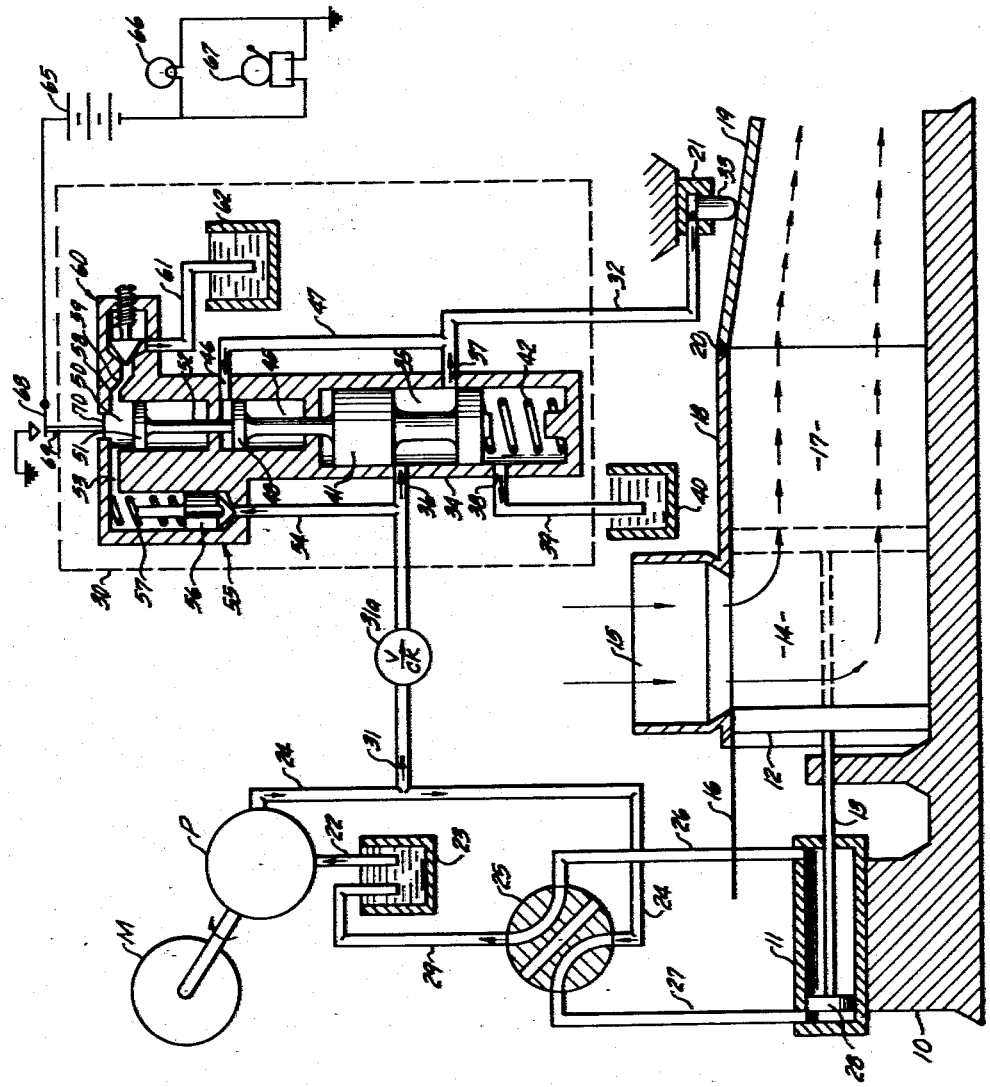
INVENTOR.
ROBERT E. SELTZER
BY Bosworth, Sessions,
Henshaw & Knowles
ATTORNEYS

# United States Patent Office 3,179,040
Patented Apr. 20, 1965

3,179,040
RELIEF VALVE
Robert E. Seltzer, Bellevue, Ohio, assignor to The American Baler Company, Bellevue, Ohio, a corporation of Ohio
Filed Nov. 6, 1961, Ser. No. 150,353
7 Claims. (Cl. 100—43)

This invention relates to hydraulic control valves and in particular to hydraulic valves having a pressure controlling and limiting function.

My invention is especially useful in compound closed loop systems such as, for example, hydraulic-mechanical systems in which there is a mechanical feed-back path or link between two points in a hydraulic section to form a closed loop system. Hydraulically operated extruding machines having a hydraulically variable and controllable resistance to the flow of material therethrough, i.e., a variable orifice, generally typify such systems. A hydraulic continuous extrusion type of machine for baling paper or other compressible materials is a specific example of such a system and, for the purposes of explanation only and not of limitation, I will describe my invention in connection with such a machine.

Known forms of such a baling machine consist of a pressure chamber for receiving compressible material to be baled from a feed hopper, a baling head driven by a hydraulic ram supplied by a pump for compressing the material in the compression chamber and forcing it into a baling chamber in which convenient units of compressed material are tied into bales. The baling chamber is arranged so that the outer ends remote from the baling end of one or more of the walls constituting the chamber are movable toward or away from an opposite wall and thus the outer end of the baling chamber in effect is an orifice or passage of variable transverse cross section.

In operation, the compressible material is radically increased in density so that a number of strokes of the baling head are required to accumulate enough compressed material to constitute a normal bale. During the accumulation of compressed material for one bale, the preceding mass of compressed material in the baling chamber may be tied into a unitary bale before it has travelled the full length of the baling chamber. Finished bales are forced out of the end of the baling chamber by succeeding amounts of compressed material forced into the baling chamber.

A continuous extrusion type of baler such as described above operates without stalling to pack compressible material against the accumulated compressed material within the baling chamber as long as the force exerted by the baling head as limited by the pressure available to the hydraulic ram equals or slightly exceeds the resistance encountered by the packed material to flow through the chamber. Such resistances in the baling chamber result from friction between the material and the chamber walls and forces sufficient to accomplish any lateral compression necessary to force the material through and out of the chamber. The friction is proportional to the normally directed forces acting between the compressed material and the baling chamber walls, as well as to the nature of the material being baled. It will be apparent that these normally directed forces and thus the resistance encountered by the baling head can be and are varied in accordance with the area of the transverse cross section of the remote end of the baling chamber as determined by the position of the movable wall or walls. As will be developed more fully below, the transverse cross-sectional area of the end of the baling chamber is conventionally controlled by a hydraulic actuator or actuators constituting an auxiliary load on the main hydraulic system supplying the ram driving the baling head.

It will be apparent that in the total system represented by such a baling machine, the points in the hydraulic system comprising the hydraulic ram providing the compression forces and the hydraulic actuator controlling the resistance to flow in the end of the baling chamber are interrelated and interact through a mechanical path comprising the baling head, the movable walls of the baling chamber and the compressed material therebetween. This path and the hydraulic system completes a loop between and constitutes a total compound closed loop system. Because of the closed loop nature of the system, the pressure developed in the hydraulic ram in exerting force through the baling head on the material to be compressed against the resistance produced by the variable orifice is directly related to the pressure in the hydraulic actuator or actuators controlling the orifice.

In order to operate such machines efficiently while producing the greatest possible density in the material being compressed or extruded, the pressures developed in the hydraulic ram must be permitted to approach very nearly the maximum pressure developed by the pump supplying it. This is particularly true in the case of a paper baling machine in which the pressure required by the hydraulic ram increases hyperbolically with the density of the material being compressed. It is also a criterion of efficient operation that the pressure developed in the hydraulic ram be prevented from equaling or exceeding the maximum pressure deliverable by the pump so that the machine will not stall. A stalled condition in the machine will result in wasted power consumption, excessive generation of heat in the system and interruption of the intended operation.

The conventional method for preventing the stalling of the ram of such a machine is to interrupt the operation by diverting the output of the pump to the reservoir and bypassing the ram. Additionally, a pressure relief and unloading valve may be provided in the hydraulic system between the pump and the hydraulic ram set to open at a pressure just below the maximum pressure deliverable by the pump. Such means serve only as protection devices against excessive and unsafe system pressure and do not really solve the problem, however, because when excessive pressures are developed, the intended operation is stopper or stalled and cannot resume until the operator of the machine removes the cause thereof. The efficiency of the machine is also materially reduced because the pressure settings at which the recycling or unloading valves operate must be well below the maximum pressure deliverable by the pump for adequate protection in view of the rapid hyperbolic rise of pressure per unit of ram travel near the end of each compression stroke. Thus the full capability of the pump can only partially be utilized and the overall efficiency of the machine is reduced.

It is one of the objects of my invention, therefore, to provide a highly efficient hydraulic system including a control device adapted for use in hydraulically operated extrusion presses having a hydraulically controllable resistance or orifice and of the closed loop type described above which permits handling of loads up to nearly the full limit of the capacity of the machine and prevents operation into loads exceeding its capacity without interruption of the machine operation.

It is also an object of my invention to provide a hydraulic anti-stall control device for such systems and machines which automatically relieves excessive load and restores the machine to its normal operating condition.

Another problem encountered in the operation of machines of the type under discussion is the achievement of uniform density in all of the compressed and extruded material. Early machines of this type employed an outlet or orifice of constant cross-sectional area in an attempt to achieve uniform density. A better method, however, has been to apply constant pressure or tension to the variable orifice controlling means. A device for accomplishing this purpose is disclosed in U.S. Patent No. 2,722,884 granted to me November 8, 1955. Even this method does not prevent stalling of the machine or halting of its operation when excessive loads are suddenly and momentarily encountered due, for example, to non-uniformity of or the presence of foreign bodies in the material being handled.

It is an object of my invention, therefore, to provide hydraulic control means for such machines employing the constant tensioning control principle and at the same time providing coacting means for preventing the stalling of the intended operation.

A further problem encountered in the operation of machines of the type under discussion may result. If high pressures are required in the hydraulic actuator or actuators controlling the variable orifice, a condition is possible in which the resistance to the flow of material through the orifice is so low as to permit the material to be only slightly compressed and pushed through the machine by relatively low pressures in the hydraulic ram and hydraulic system. Under this condition, the maximum pressure developed in the system is insufficient to charge the hydraulic actuators controlling the resistance with enough pressure to operate normally or as intended. It is necessary, therefore, that only a fraction of the pressure developed by the hydraulic ram in overcoming the resistance be utilized to charge the resistance producing and controlling means.

Consequently, it is still another object of my invention to provide a hydraulic control device adapted to reduce and control at a substantially constant but reduced level the source of pressure supplied to operate the hydraulic actuators controlling the variable orifice so that the resistance producing system will at all times remain charged and which will also permit proper operation of the anti-stall control feature of my invention.

Still another object of my invention is to provide a visual and/or audible signal at the machine and/or remote locations to indicate the fact that the stall relieving operation of the control device of my invention has operated.

Briefly, I accomplish the foregoing objects by providing a hydraulic system and controls for machines such as paper balers which consist of a pump or other similar source of pressure, a hydraulic ram for driving the head connected by a high pressure line to the pump, a hydraulic actuator or actuators for operating and controlling the variable outlet or orifice of the machine and an auxiliary or branch hydraulic line connecting the actuator with the high pressure line and including hydraulic control valve means.

The control valve is spring loaded in the opened position and closes in response to a predetermined pressure sensed in the hydraulic actuator or auxiliary load. In addition, the valve is responsive to pressure in the high pressure line or to pressure supplied at the pump and functions to unload or "dump" the pressure in the hydraulic actuator or resistance producing auxiliary load when the pressure at the pump or in the high pressure line nears a predetermined limit, preferably only slightly below the maximum of which the pump and system is capable, thereby relieving the load on the hydraulic ram driving the head and preventing the machine from stalling. The control valve is also provided with means to permit the restoration of pressure in the hydraulic actuator or auxiliary load to its predetermined value and resumption of the machine's normal operation following the operation of its stall preventing function and when the pressure in the high pressure part of the system falls below a predetermined level.

These and other objects and the method of accomplishing them will be apparent from the following description and the accompanying drawing of apparatus embodying a preferred form of my invention.

In the drawing, the single figure is a diagrammatic representation of a compound closed loop system such as referred to above and as typified by a hydraulically actuated baling machine and including hydraulic control means. A hydraulically operated positive displacement type compressing and extruding machine such as a paper baler is diagrammatically shown in the lower part of the drawing. The machine stands on a base 10 upon the left end of which is mounted a hydraulic ram 11 arranged to reciprocally operate a baling head 12 by means of piston rod 13. The baling head 12 is arranged to move back and forth in a compression chamber 14 between substantially the solid and dotted line positions shown. Material to be compressed and extruded is loaded in hopper 15 from which it enters compression chamber 14 and is pushed and pressed rightwardly into a baling chamber 17 as seen in the drawing by baling head 12. A closure 16 is provided on the side of baling head 12 adjacent the bottom of hopper 15 to prevent material in the hopper from falling into compression chamber 14 behind or to the left of baling head 12.

That portion of baling chamber 17 adjacent compression chamber 14 is of a substantially fixed and constant cross-sectional area and as seen in the drawing is defined by base 10 and fixed wall 18. A portion of the length of baling chamber 17 at the outlet end thereof is provided with at least one laterally movable wall 19 diagrammatically represented as being pivotally connected to one end to fixed wall 18 at point 20 and movable toward and away from base 10 to provide baling chamber 17 with an orifice or outlet of variable and controllable cross-sectional area. Movable wall 19 tends to be urged outwardly and away from base 10 so as to enlarge the cross-sectional area outlet of baling chamber 17 by the material pushed and pressed in and through the orifice by baling head 12. Hydraulic actuator 21 acting downwardly as seen in the drawing and against the outer side of movable wall 19 tends to urge wall 19 downwardly in a direction to decrease the cross-sectional area of the outlet of baling chamber 17. The operation of hydraulic actuator 21 will be described more fully below in connection with the hydraulic system.

The solid line arrows superimposed on the diagrammatic compression and extrusion machine represent by their direction the flow of material entering hopper 15 and passing through compression chamber 14 and baling chamber 17 and by their relative lengths the degree of compression of the material at different points in the machine.

The hydraulic system for operating the foregoing machine comprises a pump P driven by a suitable source of power, such as motor M and having a low pressure inlet conduit 22 entering from reservoir 23 and a high pressure outlet conduit 24. By means of multi-port valve 25, high pressure from the outlet pump might be supplied selectively to either end of hydraulic ram 11 through high pressure conduits 26 and 27. With valve 25 in the position shown in the drawing, the pump supplies high pressure through conduits 24 and 27 to the left side of piston 28 for driving it to the right. When valve 25 is rotated at 90°, high pressure is supplied from the conduit 24 to conduit 26 and enters hydraulic ram 11 on the righthand side of piston 28 driving it toward the left. Valve 25 has an outlet conduit 29 returning to reservoir 23 arranged to be connected with one of the two high pressure conduits supplying hydraulic ram 11 when the other is connected to high pressure conduit 24. Valve 25 may also be positioned so that fluid is merely recycled and returned to reservoir 23, thereby permitting interruption of the operation of the machine without stopping the pump.

Such a simplified system as just described for providing reciprocating motion from hydraulic pressure is, of course, well known and other different and/or more sophisticated systems may well be employed by which, for example, the multi-port valve is automatically controlled by means of limit switches or the like actuated by the hydraulic ram 11 or baling head 12. Since this part of the hydraulic system in and of itself is not novel, the simplified showing made and described here is deemed adequate.

Hydraulic actuator 21 for controlling the transverse cross-sectional area of the outlet of baling chamber 17 constitutes an auxiliary load upon the hydraulic system described above. Hydraulic actuator 21 is operated and controlled through the means of a hydraulic control valve assembly indicated generally by broken line box 30. Inlet conduit 31 connects valve assembly 30 to the high pressure side of pump P, for example, at high pressure conduit 24. A one-way check valve 31a is provided in conduit 31 for maintaining pressure built up in the auxiliary load when, for example, multi-port valve 25 is set in a recycling position. Outlet conduit 32 connects valve assembly 30 to one side of piston 33 of hydraulic actuator 21 so as to tend to urge piston 33 to reduce the cross-sectional area of the outlet of baling chamber 17.

Hydraulic control apparatus 30 consists of a housing 34 providing a main pressure chamber 35 having an opening 36 to which inlet conduit 31 is connected, an opening 37 to which outlet conduit 32 is connected, and an opening 38 connected to the low pressure side of the system as represented by conduit 39 emptying into reservoir 40. Valve means 41 is contained within chamber 35 for controlling the degree of communication through chamber 35 between openings 36 and 37. Valve means 41 is normally biased by spring 42 to a position permitting unrestricted communication through chamber 35 between openings 36 and 37 and as shown in the drawing.

Control valve assembly 30 is also provided with a pilot pressure chamber 45 having an inlet opening 46 connected by pilot pressure conduit 47 to outlet conduit 32 leading from chamber 35. Contained within chamber 45 is a piston 48 mechanically linked with valve 41 in chamber 35. It is apparent that the pressure acting on piston 33 of hydraulic actuator 21 is thus reflected in pilot pressure chamber 45 where it acts upon one side of piston 48 and in opposition to spring 42.

Another pilot pressure chamber 50 is provided in control valve assembly 30 and contains a piston 51 arranged and mechanically linked as, for example, by means of a piston rod 52 projecting through one wall of chamber 45 to have a push connection with piston 48 so as to be able to urge valve means 41 in a direction opposing the force of spring 42. Chamber 50 is provided with an inlet opening 53 communicating with conduit 31 through pilot pressure conduit 54 and spring-biased pressure relief valve indicated generally at 55 having a valve member 56 biased by spring 57 and arranged to permit pump outlet pressure in excess of a predetermined level to be reflected in chamber 50 and on one side of piston 51. Chamber 50 is also provided with an outlet passage 58 communicating with the return side of pump P through passage 59, bleed orifice indicated generally at 60 and conduit 61 to the low pressure return side of the hydraulic system indicated diagrammatically by a separate reservoir 62.

In operation, hydraulic control apparatus 30 interposed pump P and hydraulic actuator 21 acts to supply hydraulic actuator 21 with a controlled and predetermined fractional amount of system pressure through the balancing of the force of spring 42 tending to hold valve means 41 in a position permitting unrestricted flow between pump P and hydraulic actuator 21 against the force of the pilot pressure applied to piston 48 in chamber 45 as fed back from hydraulic actuator 21 through conduits 32 and 47. It will be apparent that pressure will be supplied hydraulic actuator 21 by pump P in an unreduced amount until the pressure appearing in hydraulic actuator 21 and reflected in chamber 45 on one side of piston 48 is sufficient to overcome the force of spring 42 and move valve means 41 to a position reducing or preventing communication between pump P and hydraulic actuator 21 through chamber 35. If the pressure in hydraulic actuator 21 drops below a predetermined minimum and fractional portion of total available pressures as determined by the strength of spring 42, the force exerted by spring 42 will overcome the force provided by pilot pressure acting on piston 48 and open or increase the degree of communication between pump P and hydraulic actuator 21.

Thus, spring 42 and piston 48 responsive to the pressure in hydraulic actuator 21 automatically and continuously coact in opposition to one another to provide and maintain a predetermined fractional and substantially constant amount of system pressure to hydraulic actuator 21. The resistance producing system will remain charged to operating levels even when pressure in the main supply system is low.

In addition to the pressure regulating and reducing function accomplished as described above, valve means 41 operating in chamber 35 of hydraulic control apparatus 30 cooperates and coacts with piston 51 operating in pilot pressure chamber 50 and with pressure relief valve 55 to prevent the stalling of the machine when hydraulic ram 11 encounters resistance during its compression stroke in excess of the capacity of the hydraulic system. This fast-acting anti-stall function, accomplished without interruption of the normal operation of hydraulic ram 11, is brought into operation when pressure supplied by pump P to the leftward end of piston 28 of hydraulic ram 11 exceeeds a certain predetermined value due to resistance encountered on the compression stroke. The determination of this value is performed by spring-biased relief valve 55 sensing pump pressure through pilot pressure conduit 54. When the pressure at the outlet of the pump is sufficient to displace valve member 56 from its normally closed position against the force of spring 57, pressure is admitted to the topside of piston 51 in chamber 50 urging the piston downwardly and by means of the piston rod 52 urging valve 41 downwardly against spring 42 until opening 37 in chamber 35 is placed in communication with opening 38 in chamber 35 connecting hydraulic actuator 21 with the low pressure side of the hydraulic system indicated diagrammatically by reservoir 40. In this fashion, the pressure supplied hydraulic actuator 21 is quickly dumped when excessive loads are encountered, permitting the transverse cross-sectional area of the outlet of baling chamber 17 to increase and reduce the resistance encountered by hydraulic ram 11 on its compression stroke and thereby prevent the machine from stalling. When the resistance opposing the compression stroke is thus sufficiently reduced, hydraulic ram 11 proceeds forward and the pressure at the outlet of pump P and sensed by pressure relief valve 55 decreases until valve member 56 closes. With pressure removed from piston 51 in pilot chamber 50, spring 42 urges valve 41 and pistons 48 and 51 to return to their positions shown in the drawing. The fluid in chamber 50 is exhausted through bleed orifice 60 to the return side of the system, i.e., reservoir 62. Control apparatus 30 is restored to its prior condition and resumes the functions of providing a fractional and substantially constant amount of system pressure to hydraulic actuator 21.

Thus, in addition to the normal regulating of pressure supplied to hydraulic actuator 21 at a predetermined constant level, control apparatus 30 also functions to prevent the stalling of the compressing machine by automatically reducing the pressure in hydraulic actuator 21 when the outlet pressure of pump P exceeds a predetermined minimum. Further, this function is accomplished without the dumping and disabling of main system pressure as would occur through the use of a main pressure system relief valve. Additionally, the hydraulic control apparatus 30 acts to automatically restore the control of the variable area outlet from baling chamber 17 to hydraulic actuator 21 upon the reduction in main system pressure below a predetermined minimum value.

Control apparatus 30 also provides a slow-acting dumping function through valve means 41 which may be urged far enough in opposition to spring 42 to interconnect openings 37 and 38 by pressure from hydraulic actuator 21 as when piston 33 is forced to retract by outward movement of wall 19 due to a build up of material in the outlet of baling chamber 17. This function of control apparatus 30 is relatively slow-acting and generally will not occur because of the above described faster-acting control function of the apparatus. It does serve a back-up or emergency purpose in the event of failure of operation of the faster-acting control.

Visual and/or aural indication of the operation of the anti-stall control apparatus 30 can be easily and simply provided by means of an electrical circuit containing a source of power such as battery 65 connected to visual indicator such as lamp 66 or an aural indicator such as bell 67. The circuit is completed through a pressure sensitive microswitch 68 actuated by means such as link 69 and diaphragm 70 in the wall of chamber 50 responsive to the pressure in chamber 50 of the hydraulic control apparatus 30. Thus when relief valve 55 is opened admitting pressure in chamber 50 and applying pressure to piston 51 so that pressure on hydraulic actuator 21 is dumped through opening 38 of chamber 35, the switch is closed completing the circuit. Lamps and/or bells may be conveniently installed at the machine or at remote locations or both permitting the machine to be safely and continuously operated without or only the semi-attendance of an operator. The visual and aural indicators also permit counting of the number of times the anti-stall feature operates without actual observation of the machine itself.

Changes, modifications and improvements may be made to the above-described preferred form of my invention without departing from the precepts and principles of the invention. Therefore, I do not wish my patent to be limited to the particular form of my invention specifically illustrated and described nor in any manner inconsistent with the extent to which my invention has promoted the art.

I claim:
1. A hydraulic valve comprising
a chamber having an inlet passage, an outlet passage, a pressure feedback passage in communication externally of said chamber with said outlet passage, and a pressure relief passage,
movable valve means in said chamber for controlling communication between said inlet and said outlet passages and between said outlet passage and said pressure relief passage, said valve means being spring-biased to a position permitting communication between said inlet passage and said outlet passage and biased by pressure in said outlet passage communicated through said pressure feedback passage to a position tending to reduce communication between said inlet passage and said outlet passage, and
hydraulically actuated means including an element movable in response to a predetermined pressure in said inlet passage and operatively connected to said movable valve means for tending to move said valve means to a position permitting communication between said outlet passage and said relief passage when the pressure in said inlet passage exceeds said predetermined pressure.

2. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance,
the combination with said hydraulic actuator of a hydraulic control device responsive to the pressure supplied to said ram during application of a compressive force comprising
a pressure chamber,
a movable piston in said pressure chamber,
a normally closed pressure relief and check valve having an upstream side and a downstream side and adapted by a relief pressure setting to open when pressure applied to its upstream side exceeds a level determined by said relief pressure setting,
first conduit means connected to and supplying the upstream side of said relief and check valve with the pressure supplied to said ram during application of a compressive force,
second conduit means connecting the downstream side of said relief and check valve and said pressure chamber for admitting pressure to said pressure chamber through said relief and check valve in excess of said relief pressure setting of said relief and check valve, and
movable valving means hydraulically connected between the source pressure and said hydraulic actuator for controlling the source pressure supplied to and for unloading the pressure from said hydraulic actuator and including force-transmitting means connected to and actuatable by movement of said movable piston when a pressure is admitted to said pressure chamber through said relief and check valve for moving said movable valving means so as to unload the pressure from said hydraulic actuator.

3. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance,
the combination with said hydraulic actuator of a hydraulic control device responsive to the pressure supplied to said ram during application of a compressive force comprising
a pressure chamber,
a movable piston in said pressure chamber resiliently biased toward one position therein,
a normally closed pressure relief and check valve having an upstream side and a downstream side and adapted by a relief pressure setting to open when pressure applied to its upstream side exceeds a level determined by said relief pressure setting,
first conduit means connected to and supplying the upstream side of said relief and check valve with the pressure supplied to said ram during application of a compressive force,
second conduit meons connected to the downstream side of said relief and check valve and said pressure chamber for admitting pressure to said pressure chamber through said relief and check valve in excess of said relief pressure setting of said relief and check valve whereby pressure supplied said pressure chamber from said second conduit means acts on said piston to oppose its resilient bias,
a bleed orifice in said pressure chamber for bleeding off pressure therefrom, and
movable valving means hydraulically connected between the source pressure and said hydraulic actuator and movable from and between a closed position for maintaining pressure in said hydraulic actuator and an open position for relieving and for unloading the pressure in said hydraulic actuator, said valving means resiliently biased toward the closed position and connected to and actuatable by said movable piston for movement to the open position when pressure is admitted to said pressure chamber from said relief and check valve whereby the pressure in said hydraulic actuator is unloaded when a pressure is admitted to said pressure chamber through said relief and check valve and is restored when the pressure supplied to the upstream side of said relief and check valve is less than said relief pressure setting.

4. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance, the combination with said hydraulic actuator of a hydraulic control device for regulating the pressure supplied to said hydraulic actuator and responsive to source pressure supplied to said hydraulic ram comprising first hydraulic means hydraulically connected in supply-controlling relationship to said hydraulic actuator for controlling and maintaining the pressure supplied said actuator by said source at a predetermined fractional amount of the source pressure and independently of variations in source pressure and second hydraulic means responsive to source pressure supplied to the hydraulic ram and operatively interconnected to said first means by structural means and for overriding the control provided by said first means of pressure supplied said actuator and for reducing and unloading the pressure supplied said actuator when the source pressure supplied to the hydraulic ram approaches the pressure limit of the source.

5. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance, the combination with said hydraulic actuator of a hydraulic control device for regulating the pressure supplied to said hydraulic actuator and responsive to source pressure supplied to said hydraulic ram comprising first hydraulic means hydraulically connected in supply-controlling relationship to said hydraulic actuator for controlling and maintaining the pressure supplied said actuator by said source at a predetermined fractional amount of the source pressure and independently of variations in source pressure and second hydraulic means responsive to source pressure supplied to the hydraulic ram and operatively interconnected to said first means by structural means and for overriding the control provided by said first means of pressure supplied said actuator and for reducing and unloading the pressure supplied said actuator when the source pressure supplied to the hydraulic ram approaches the pressure limit of the source and including means for restoring the supply and control of the pressure supplied said actuator to said first means when the pressure supplied to the ram during application of a compressive force falls away from the pressure limit of the source.

6. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance, the combination with said hydraulic actuator of a hydraulic control device for regulating the pressure supplied to said hydraulic actuator and responsive to the pressure developed in said ram during application of compressive force comprising first hydraulic means hydraulically connected in supply-controlling relationship to said hydraulic actuator for controlling and maintaining the pressure supplied said actuator by said source independently of variations in source pressure and second hydraulic means comprising
a pressure chamber,
conduit means connected to said pressure chamber for supplying pressure supplied to said ram during application of a compressive force to said pressure chamber,
a pressure relief valve connected in flow-controlling relationship between said conduit means and said pressure chamber for admitting from said conduit means pressure supplied thereto in excess of a predetermined level to said pressure chamber,
and a movable piston in said pressure chamber, said movable piston being resiliently biased in one direction and tending to be moved in the opposite direction by and in response to pressure supplied to said chamber from said conduit means and through said pressure relief valve and operatively connected to said first hydraulic means for overriding the control thereof by said first hydraulic means and for reducing and unloading the pressure supplied said actuator when pressure is admitted to said pressure chamber by said pressure relief valve.

7. In apparatus for applying a compressive force on material collected in a chamber and against a controllable resistance comprising a variable orifice and having a source of limited hydraulic pressure connected to and supplying a hydraulic ram for applying said force up to the pressure limit of said source and a hydraulic actuator connected to and supplied by said source for controlling the magnitude of said resistance, the combination with said hydraulic actuator of a hydraulic control device for regulating the pressure supplied to said hydraulic actuator and responsive to the pressure developed in said ram during application of compressive force comprising first hydraulic means hydraulically connected in supply-controlling relationship to said hydraulic actuator for controlling and maintaining the pressure supplied said actuator by said source independently of variations in source pressure and second hydraulic means comprising
a pressure chamber,
conduit means connected to said pressure chamber for supplying pressure supplied to said ram during application of a compressive force to said pressure chamber,
a pressure relief valve connected in flow-controlling relationship between said conduit means and said pressure chamber for admitting from said conduit means pressure supplied thereto in excess of a predetermined level to said pressure chamber and
a bleed orifice in said pressure chamber for bleeding off pressure from said pressure chamber and
a movable piston in said pressure chamber, said movable piston being resiliently biased in one direction and tending to be moved in the opposite direction by and in response to pressure supplied to said chamber from said conduit means and through said pressure relief valve and operatively connected to said first hydraulic means for overriding the control thereof by said first hydraulic means and for reducing and unloading the pressure supplied said actuator when pressure is admitted to said pressure chamber by said pressure relief valve and means for restoring the supply and control of the pressure supplied said actuator to said first hydraulic means when the pressure supplied to the ram during the application of a compressive force falls below said predetermined level and when the pressure in said pressure chamber falls below said predetermined level by bleeding away through said bleed orifice.

References Cited by the Examiner

UNITED STATES PATENTS

| | | | |
|---|---|---|---|
| 722,355 | 3/03 | Cain | 137—489.5 |
| 1,386,051 | 8/21 | Dieter | 137—505.18 X |
| 1,966,378 | 7/34 | Dinzl | 100—192 X |
| 2,053,330 | 9/36 | Fitch | 137—505.18 X |
| 2,168,889 | 8/39 | Thomas | 18—125 |
| 2,340,009 | 1/44 | Meakin | 100—43 |
| 2,396,720 | 3/46 | Nolt | 100—192 X |
| 2,722,884 | 11/55 | Seltzer | 100—192 |
| 2,763,201 | 9/56 | Hauswirth | 100—43 |
| 2,805,680 | 9/57 | Longbottom et al. | 137—505.18 X |
| 3,024,719 | 3/62 | Endlund | 100—192 X |

FOREIGN PATENTS

| | | |
|---|---|---|
| 1,227,735 | 3/60 | France. |

WALTER A. SCHEEL, *Primary Examiner.*
A. G. STONE, *Examiner.*